(12) United States Patent
Vanella

(10) Patent No.: US 12,485,428 B2
(45) Date of Patent: Dec. 2, 2025

(54) HIGH EFFICIENCY NEGATIVE IONISATION CELL FOR FINE PARTICLES, ULTRAFINE PARTICLES AND NANOPARTICLES PRESENT AT HIGH AND ULTRA-HIGH DENSITY IN FUMES, IN VEHICLE EXHAUST GASES AND IN THE AIR

(71) Applicant: Salvatore Vanella, Monteciccardo (IT)

(72) Inventor: Salvatore Vanella, Monteciccardo (IT)

(*) Notice: Subject to any disclaimer, the term of this patent is extended or adjusted under 35 U.S.C. 154(b) by 248 days.

(21) Appl. No.: 18/260,557

(22) PCT Filed: Mar. 14, 2022

(86) PCT No.: PCT/IB2022/052260
§ 371 (c)(1),
(2) Date: Jul. 6, 2023

(87) PCT Pub. No.: WO2022/195438
PCT Pub. Date: Sep. 22, 2022

(65) Prior Publication Data
US 2024/0299954 A1    Sep. 12, 2024

(30) Foreign Application Priority Data
Mar. 18, 2021  (IT) .................. 102021000006584

(51) Int. Cl.
*B03C 3/41* (2006.01)
*F24F 8/192* (2021.01)
*F24F 8/30* (2021.01)

(52) U.S. Cl.
CPC ............... *B03C 3/41* (2013.01); *F24F 8/192* (2021.01); *F24F 8/30* (2021.01); *B03C 2201/10* (2013.01)

(58) Field of Classification Search
CPC .... B03C 3/12; B03C 3/04; F24F 8/192; F24F 8/30
See application file for complete search history.

(56) References Cited

U.S. PATENT DOCUMENTS

| 2011/0111691 A1 | 5/2011 | Kagawa et al. |
| 2014/0178254 A1* | 6/2014 | Tsui .................. A61L 9/22 422/121 |

(Continued)

FOREIGN PATENT DOCUMENTS

| EP | 3760316 A1 | 1/2021 |
| WO | 2020104488 A1 | 5/2020 |

OTHER PUBLICATIONS

International Search Report and Written Opinion for Corresponding International Application No. PCT/IB2022/052260, 15 pages, Jul. 5, 2022.

*Primary Examiner* — Sharon Pregler
(74) *Attorney, Agent, or Firm* — LUCAS & MERCANTI, LLP

(57) ABSTRACT

A negative ionization cell for negatively ionizing fine, ultrafine or nanoparticles present in an air flow defined by fumes, vehicle exhaust gases or indoor environments is disclosed. The cell has a body defining an ionizing part having first and second portions which are elongated, preferably plate-like, and facing each other. The first portion has a negative voltage to generate a potential difference with the second portion. The first and second portions also define a passage for the air flow and the first portion supports a plurality of elongated and sharp-pointed bodies projecting into the passage for the air flow and orthogonally to the air flow. The elongated and sharp-pointed bodies generate an electron flow, directed toward the second portion due to the potential difference and intercept the solid particles in the air flow to negatively charge them. An air purifier including the negative ionization cell is also disclosed.

13 Claims, 6 Drawing Sheets

(56) References Cited

U.S. PATENT DOCUMENTS

| | | |
|---|---|---|
| 2015/0360233 A1 | 12/2015 | Vanella |
| 2017/0341087 A1* | 11/2017 | Yuge .................. A47L 9/1683 |
| 2018/0078950 A1 | 3/2018 | Sato et al. |

\* cited by examiner

HIGH EFFICIENCY NEGATIVE IONISATION CELL FOR FINE PARTICLES, ULTRAFINE PARTICLES AND NANOPARTICLES PRESENT AT HIGH AND ULTRA-HIGH DENSITY IN FUMES, IN VEHICLE EXHAUST GASES AND IN THE AIR

CROSS-REFERENCE TO RELATED APPLICATIONS

This application is a 371 of PCT/IB2022/052260, filed Mar. 14, 2022, which claims the benefit of Italian Patent Application No. 102021000006584, filed Mar. 18, 2021.

FIELD OF THE INVENTION

Forming an object of the present invention is a negative ionization cell of particulate, containing ultrafine particulate and nanoparticles, present in air flow according to the preamble of the main claim. Furthermore, forming an object of the invention is a negative ionization air purifier provided with such negative ionization cell.

BACKGROUND OF THE INVENTION

The invention relates to a high efficiency negative ionization cell for fine particles, ultrafine particles and nanoparticles present in an air flow defined by fumes from chimney stacks and chimneys or by exhaust gases of vehicles with internal combustion engines, and present in the air of indoor environments.

Air purification systems have been known for several decades. Some of such systems use electrostatic filters in which there is generated a positive ionization in the solid particles present in the air, to be captured. Such ionization is obtained in such electrostatic filters by positively ionizing the solid particles from which electrons are removed.

The air flow containing these positively charged particles is made to pass through an electric field, consisting of a positive electrode and a negative electrode. The positive electrode repels the positively charged particles, and the negative electrode draws them making them deposit thereon.

This type of purifier is functional to stopping the "coarse" solid particles with measuring from a few microns upwards in size. However, while the abatement performance is acceptable for small and medium-size particles (larger than a few microns), said performance is very limited, if not insignificant, as regards smaller particles and precisely as regards ultrafine particulate and nanoparticles smaller than 100 nm which can reach values greater than tens and even hundreds of millions of particles per litre of smoke or gas or air.

Such electrostatic filter systems were beneficially used up to the 1980-1990 period, when the particles present in the air above all derived from the combustion of charcoal and wood, particles which therefore had dimensions such to be effectively captured by said electrostatic filters.

However, over the last decades in the air there are increasingly smaller particles, with particle size comprised between a few nanometres and about 10 microns. Such particles are emitted by industrial plants and by vehicles and they have almost totally replaced particles with larger particle size given that the fumes emitted by such plants and vehicles are filtered so as to retain the particles with larger dimensions.

However, as mentioned, there are emitted particles with very fine particle size, the so-called Nanoparticles (NP) indicated as Ultra Fine Particulate (UFP) respectively with particle size ranging from 50 nm to 1 nm and from 100 nm to 50 nm. Given that these particles are very volatile, they are therefore carried by wind even far from the place where they are generated (up to thousands of kilometres) and they precipitate to the ground extremely slowly.

These particles are very dangerous if inhaled as shown by recent epidemiological studies, for example see "Passage of Inhaled Particles Into the Blood Circulation in Humans" A. Nemmar, et al. dated in 2002; "Ultrafine particles in cities" Prashant Kumar, et al. dated 2014; or the publication "Ultrafine Particulate Matter Study in the San Francisco Bay Area" dated August 2010.

These studies showed that such particles of the UFP and NP type are responsible for many diseases.

In particular, it was observed that such particles, once inhaled, are not retained by the lung membrane, but they pass through it and enter into the blood. Therefore, they can reach the body cells and due to the low particle size thereof, they can pass through the cell membrane until they enter into the RNA of the cells.

In an attempt to capture such particles of the UFP and NP type, there have been developed new devices, such as for example those described in WO2020/104488 and US2017/0341087, where there is provided for the joining of a unit or ionizing part, suitable to negatively charge the particles present in the air, and with a unit for collecting such ionizing part. This defines an air purifier.

Therefore, such known air purifiers comprise a first ionization part which has the purpose of negatively ionizing the particles present in the air flows which pass through it and they are used, for example, for indoor environments, and they have different shapes and dimensions. As mentioned, such purifiers consist of an ionizing part and a collection part.

More particularly, in the prior art solutions, the ionizing part is suitable to transfer a negative charge to the solid particles present in the air flow exploiting the corona principle of the tips, that is the ability of a tip, subjected to an appropriate negative voltage, to emit electrons into space so as to create an electronic area or cloud around the tip. To this end, in the aforementioned prior art there is described an ionizing part or unit comprising elongated emitter elements (pointed) arranged with an axis parallel or orthogonal to the air flow and immersed in said flow: said elongated emitter elements are connected to a negative voltage supply and generate-around their free end (tip)—an electronic cloud due to the corona discharge, thus releasing electrons which negatively charge the solid particles in the air flow that touches such elements, air defined by smoke or by gas or by air present in an indoor environment.

Such air flow, with the particles thus charged, moves towards the collection unit or part of the air purifier, which follows the ionizing part. Such collection part has the task of collecting the solid particles to which the negative electric charge was previously transferred by the ionizing part of the purifier. For this purpose, such collection part comprises parallel plates between which there is created a positive electric field. Particularly, the collection part comprises a collection plate charged with positive voltage which draws the negatively charged solid particles and a negatively charged plate which has the purpose of repelling the negatively charged particles towards the positive plate.

Alternatively to the negatively charged plate, there may be used a plate connected to earth or a neutral plate, that is without applying a negative voltage and without being connected to earth.

The greater the value of the electric field between the positively charged collection plate and the negatively charged one or connected to earth or neutral, the greater the possibility of capturing the ionized particles which pass through the electric field between the plates and therefore the greater the abatement performance of the air purifier.

However, as also described in the aforementioned prior art texts, the ability to create such electronic cloud around said sharp-pointed elements (for example triangular-shaped) is limited by the intention not to create excessive ozone in the air. Therefore, even such prior art solutions which exploit only the corona discharge to negatively charge the UFPs and NPs present in the air, did not reveal to be effective.

In recent years, the problem of UFPs and NPs has become increasingly clear, even due to the pollution by internal combustion engine vehicles and the density of such particles per litre of air has increased significantly.

By way of example, in 2017 air was inspected in a limited traffic zone in Roma. This inspection showed that, in a litre of air there were present about 20 PM10 particles, 176 PM2.5 particles, 1203 PM1 particles and $58 \times 10^6$ ultrafine particles-nanoparticles (UFP/NP). As observed, the value of the UFPs/NPs significantly exceeds that of average-size particles and of the fine particles, entailing the potential serious danger for the health of the people present in the area subjected to measuring (for the reasons indicated further above).

Studies and tests carried out showed that the density of the particles present in the atmospheric air is a function of the size thereof; the density per litre of air of the fine particles (10 μm-0.3 μm) may reach a few tens of thousands, while the ultrafine particles/nanoparticles (UFPs/NPs) may reach a very high density even more than 100 millions of particles per litre of air and much more in fumes and in exhaust gases of internal combustion engine vehicles.

The density of UFPs/NPs present in 1 litre of air in indoor environments is even greater and it can even reach values equal to three or four times the density of such particles in the outdoor environment. Such density varies from one place to another as a function of the vicinity or non-vicinity of sources of emission such as industrial plants, incinerators or energy production plants and petroleum derivatives, or of the vicinity to busy traffic roads.

In recent years it was observed that such density is continuously increasing due to the hundreds of thousands of emitter sources existing on the planet which are continuously increasing in numbers, and due to the low ability to reduce the particles already emitted due to the formation of raindrops or due to snow and due to agglomeration phenomenon between several particles.

It is clear that the ability of the solid particles in the air to be ionized, through the corona discharge decreases as the density of the particles increases and as the size thereof decreases; as a result, this significantly reduces the possibility that the UFPs and NPs be captured, reducing the abatement performance level of an air, fumes or exhaust gases purifying system operating based on ionization. Specifically due to this reason, the abatement performance of ionization air purifiers made according to the prior art, for larger particles (0.5-1-2.5-10 μm) it is much higher with respect to that for smaller particles; this also due to the fact that for larger particles there is a higher capacity to be ionized, given that this capacity increases as the particle size increases.

On the contrary, for solid particles with much smaller size or particle size (UFPs and NPs), the ionization air purifiers made according to the prior art have a much lower abatement performance, given that the ability of such particles to be ionized is much lower both due to the fact that the size of the particles themselves is smaller and due to the fact that the density is a thousand or ten thousand times and beyond higher than the density of the largest particles, per $cm^3$ or per litre of air.

In particular, in current purifiers, the tip-like emitter elements supplied with negative voltage and aligned to the air flow direction or even arranged orthogonally to such flow they emit-due to corona discharge-a "limited" amount of electrons, located around the tip of the emitter element; such electrons are able to ionize, in a manner sufficient to be captured, only a limited part of the fine particles, ultrafine particles or nanoparticles, present in the air flow with a very high density. Therefore, the limited ability of negative ionization of the particles, results in a limited percentage of particles captured by the air purifier.

SUMMARY OF THE INVENTION

An object of the present invention is to provide a negative ionization cell suitable to effectively interact with an air flow which passes through and which contains high and ultra-high density fine, ultrafine particles or particulate (UFP) and nanoparticles (NP), said interaction allowing to charge said particles with negative electric charge for a subsequent removal thereof from said air flow.

In particular, an object of the invention is to provide a negative ionization cell that has high efficiency in the interaction with the air flow containing fine, ultrafine particles or particulate and nanoparticles up to sizes smaller than 10 nm, particles which are present even at an ultra-high density (up to tens of millions per $cm^3$) in fumes from chimney stacks, chimneys and exhaust gases of internal combustion engines, therefore, in the air.

A further object of the present invention is to provide a negative ionization cell of the type mentioned above that can be effectively used both in indoor environments to sanitise the air present therein and at the openings of chimneys, chimney stacks or exhaust pipes of vehicles with an internal combustion engine from which the fumes exit.

Another object of the present invention is to provide an air purifier provided with a negative ionization cell of the type mentioned above which has a high abatement performance with respect to the particles of type UFP and NP.

Another object is to provide an air purifier that can be effectively used not only for purifying the air from fine particles, from ultrafine particles, from nanoparticles, but that is also capable of drastically reducing microbiological pollution (viruses, spores, bacteria, moulds and fungi), of any type and size, present in said indoor environments or in air treatment plants in temperature and humidity.

A further object of the invention is to provide an air purifier of the mentioned type that is however simple to manufacture and that is cost-effective.

These and other objects which shall be more apparent to the person skilled in the art are attained by a negative ionization cell used in an air purifier according to the attached claims.

BRIEF DESCRIPTION OF THE DRAWINGS

For a better understanding of the present invention, the following drawings are attached hereto, by way of non-limiting example, wherein.

DETAILED DESCRIPTION OF THE INVENTION

With reference to the mentioned figures, shown therein is an ionization air purifier 100 and the main parts aimed at allowing the air purification or sanitisation; such purifier comprises a negative ionization cell 1 and a collection part 3.

More particularly, the ionization cell 1 comprises an ionizing part 2 which is suitable to charge—with a negative electric charge—the particles (even the fine particles, ultrafine particles and nanoparticles) present in an air flow which passes through ionization cell 1 so that the collection part 3 is capable of capturing such particles and retain them therefore removing them from said air flow. Such part 2 of the ionization cell and the collection part 3 are arranged close to each other.

Figure 3:
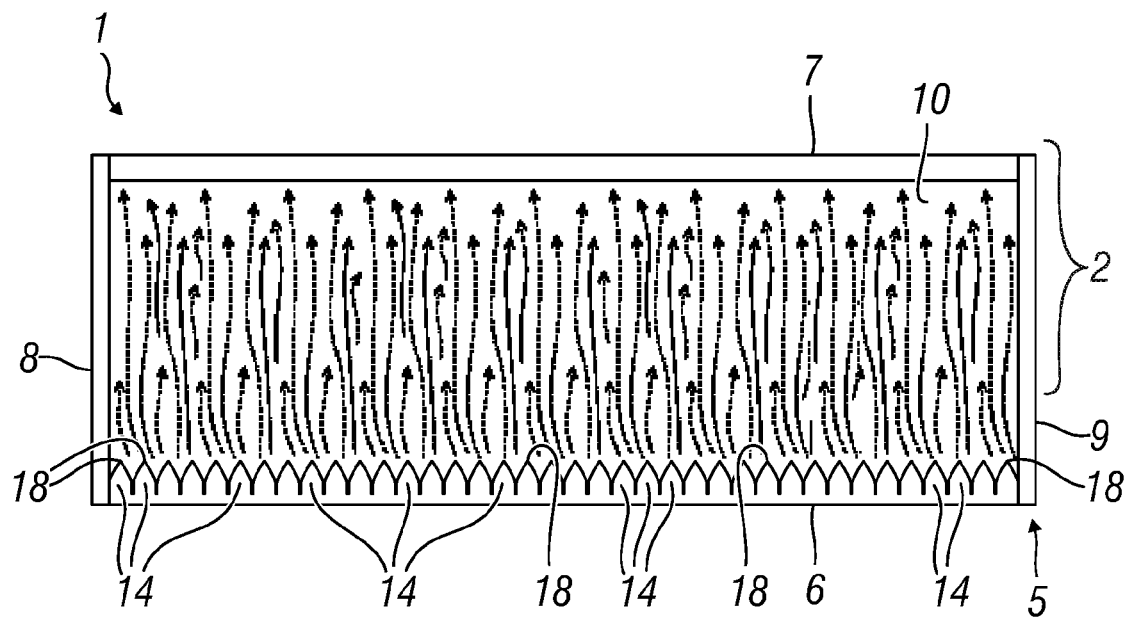
FIG. 3 shows a front view of a first embodiment of a negative ionization cell used in the air purifier of FIG. 1 and which does not fall within the scope of protection of the present invention.
Figure 4:
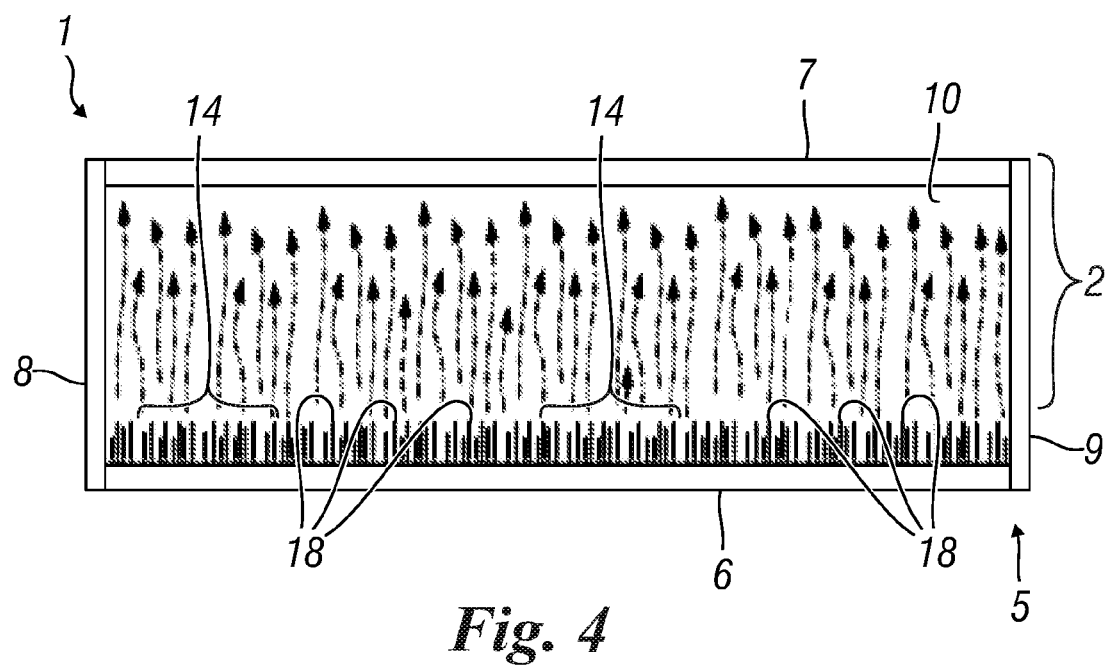
FIG. 4 shows a front view of a variant of the negative ionization cell of FIG. 3 and which does not fall within the scope of protection of the present invention.
Figure 5:
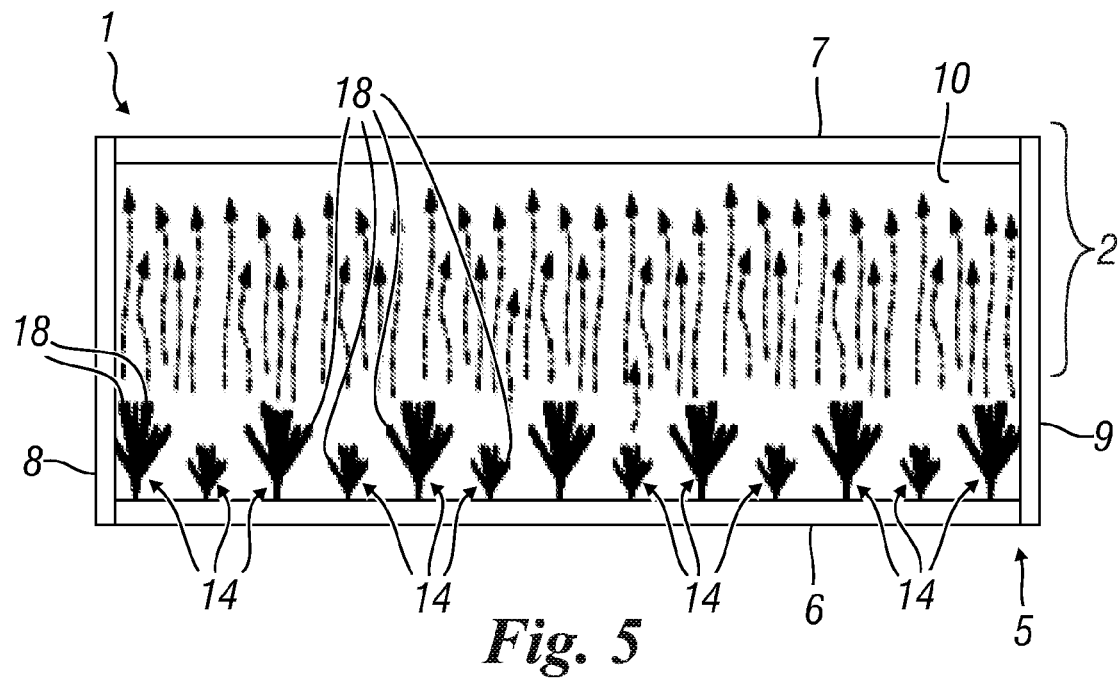
FIG. 5 shows a front view of a further variant of a negative ionization cell, which falls within the scope of protection of the present invention.
Figure 6:
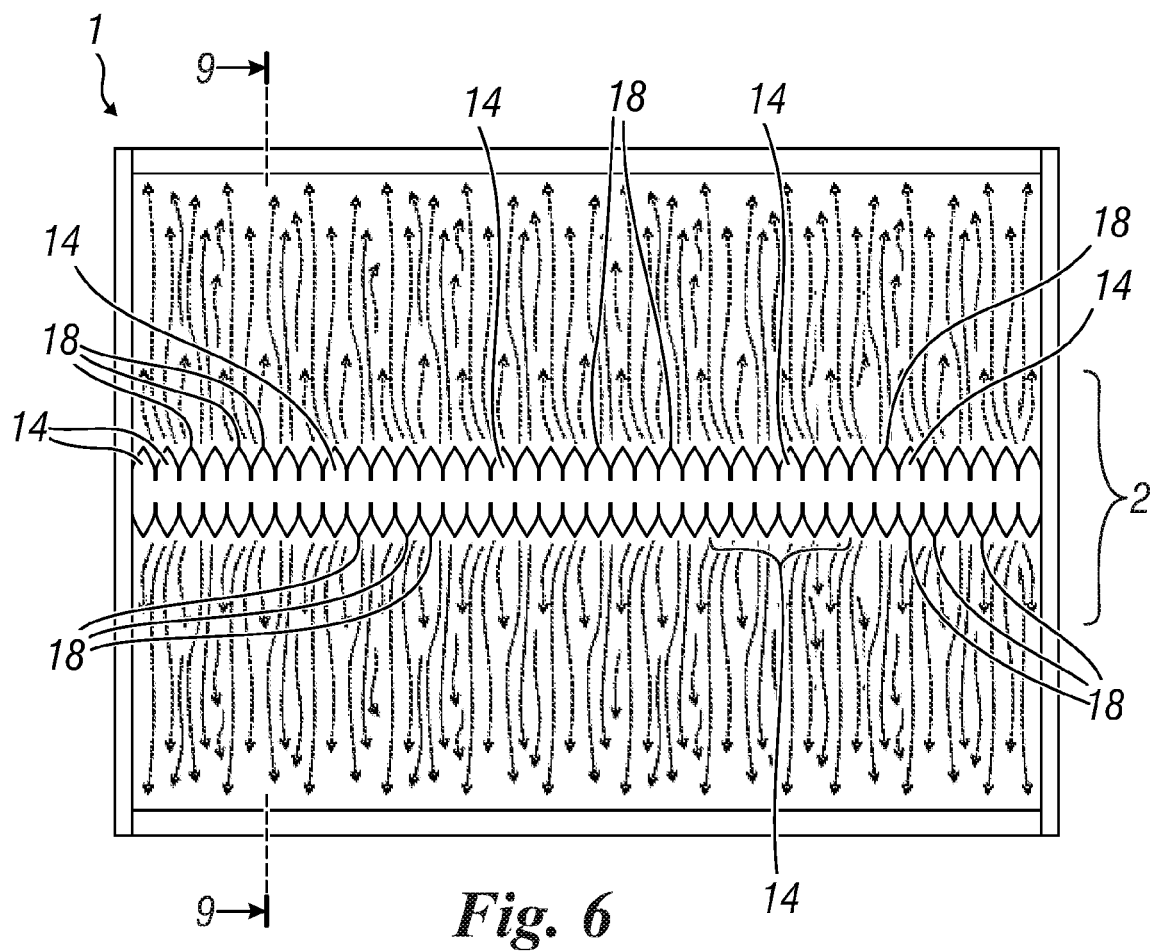
FIGS. 6-8 show, with some parts omitted for the sake of simplicity, further embodiments of a negative ionization cell also indicated as a double negative ionization cell, the embodiments shown in FIGS. 6 and 7 not falling within the scope of protection of the present invention.
Figure 7:
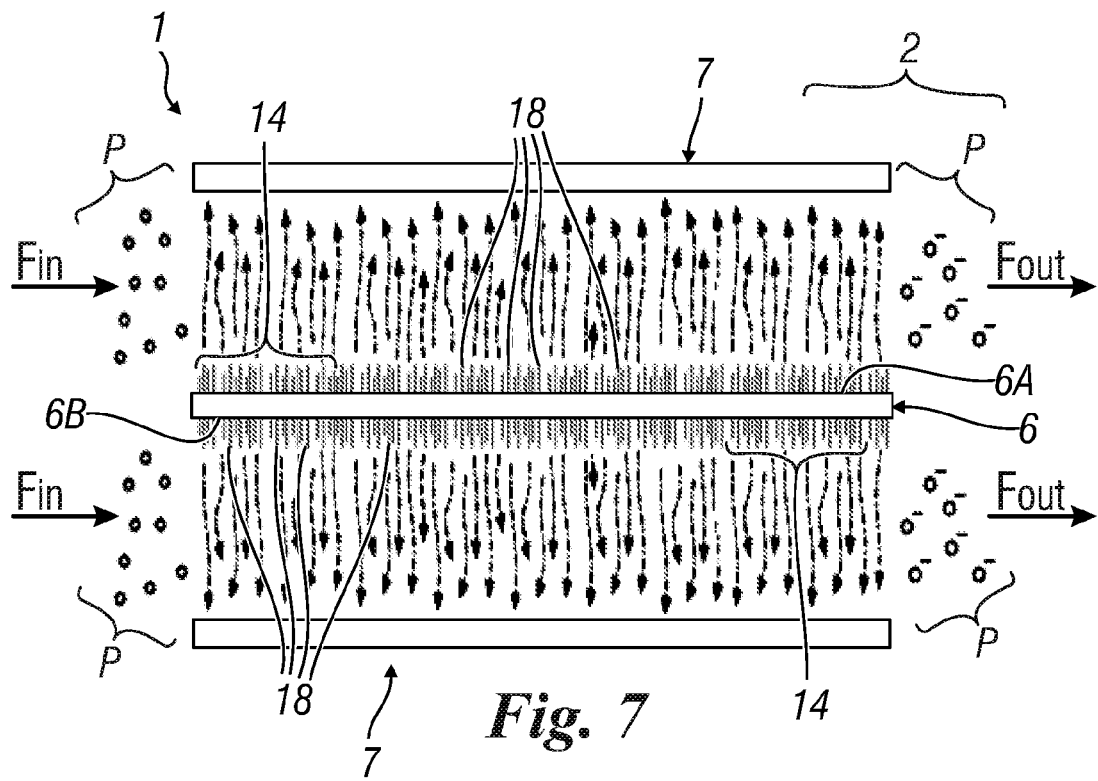

In the simpler embodiment thereof, see FIG. 3-5, wherein the embodiments of FIGS. 3 and 4 do not fall within the scope of protection of the present invention, the ionization cell 1 comprises a polygonal body 5 having sides or portions 6, 7, 8 and 9 which can be defined by linear structures (for example bars with any cross-section) or by flat surfaces (for example plates) arranged parallel to each other. In particular, such body 5 comprises a first portion 6 arranged spaced from a second portion 7 and defining, with the sides or end portions 8 and 9 that connect them, a passage 10 for an air flow F which transports the particles P suspended. The flow is shown in some figures (for example FIGS. 7 and 8) in the step for the inflow (FIN) thereof into the ionizing part 2 and in the step for the outflow (Four) thereof from the latter and it is indicated corresponding arrows.

The particles or particulate may be fine or ultrafine or it may be defined by fine nanoparticles smaller than 10 nm, also present in ultra-high density per cm$^3$.

The purifier 1 may be used to purify air in indoor environments or to purify the smoke exiting from a chimney stack or exhaust fumes from a vehicle.

Back to the ionizing part 2 of the ionization cell 1, it is defined by the first and second portion 6, 7 of the cell 1 mentioned above. Such ionizing part 2 has a plurality of elongated elements 14 projecting from the first portion 6 of the body 5 and protruding into the passage 10 towards the second portion 7. Such elongated elements 14 are arranged orthogonally to the air flow F which passes in the ionizing part 2. As shown with regard to embodiment of the ionizing part 2 shown in FIG. 10, the first portion 6 is connected to the negative pole of a battery 16 or other electric energy generator (such connection is indicated by single lines); the second portion 7 is instead connected to the positive pole of said battery 16 (this is represented by double lines) or, alternatively, it is connected to ground (to earth).

This allows to create a potential difference of known value between the first and the second portion 6, 7 of the body 5, in the passage 10. Thanks to the connection to a negative voltage of the first portion 6, the elongated (and sharppointed) elements 14 are also subjected to an electric potential difference with the second portion 7.

With reference to FIG. 5, showing an embodiment of the invention, the elongated elements 14 each provide for several tips 18 (or a "plurality of tips") so as to take a branched shape, tips present at the ends of corresponding wire-like elements projecting and facing toward the portion 7. Such tips 18 are, for each elongated element, connected to a single base element 14A connected to the first portion 6.

Such tips 18 of each branched elongated element 14 basically and as a whole define an electrode suitable to generate a high flow of electrons (emitted by the tip) which moves, orthogonally to the air flow F, towards the portion 7 with positive charge or connected to earth.

The particular conformation of each branched elongated element 14 allows to generate a high flow of electrons from said element, flow which occupies a passage area 10 which is very broad with respect to the position of the base element 14A from which the respective tips protrude. As a matter of fact, the latter can "open" in a cone-like fashion so as to occupy a significant position of space in the passage 10 facing the portion 7. This allows to generate a high flow of electrons from a single base element 14A connected to the portion 6 and it allows to have an almost 100% abatement performance as regards particles defined by UFPs and NPs by a purifier provided with the ionization cell 2 described above. Such performance is significantly higher than the one that can be obtained with prior art solutions, for example from prior art patent texts mentioned above, given that in the ionization cell 2 according to the present invention the particles are not ionized given that they pass through an electron cloud created-due to the corona discharge-around the tip of an elongated element 14, but they are ionized given that they are impacted by the electron flow which moves between the portions 6 and 7 of the cell 2. Such elongated and branched elements 14 may be arranged on the same row or preferably on several subsequent rows, even suitably staggered, so as to emit a flow of ultra-high density negative charges in the passage 10 in which the air drawn back into such passage due to natural or forced convention in any known manner moves: for example in the case of ambient air, it is generally moved by a fan (of various types and size) as a function of the m$^3$/h flow rate intended to be treated using the purifier. The negative charges (electrons) which impact the solid particles 9 present in the air flow F negatively ionize such particles.

The high flow of negative charges generated by all elongated and branched elements 14 opening in a cone-like fashion with the wire-like elements and the tips thereof, and the arrangement thereof orthogonal to the air flow F, allow to negatively charge also the fine particles, ultrafine particles or particles with size corresponding to the nanoparticles.

This obviously occurs for every type of particle, this expression being used to indicate any solid body transported by the air, whether it is inert (such as ash or vehicle exhaust gases) or organic, such as viruses, bacteria or microorganisms of any type or size.

The portions 6 and 7 may be defined by substantially linear bodies, such as bars, or, preferably, by plate-like elements, as shown in the FIGS. 8, 9, 10 and 11.

Figure 8:
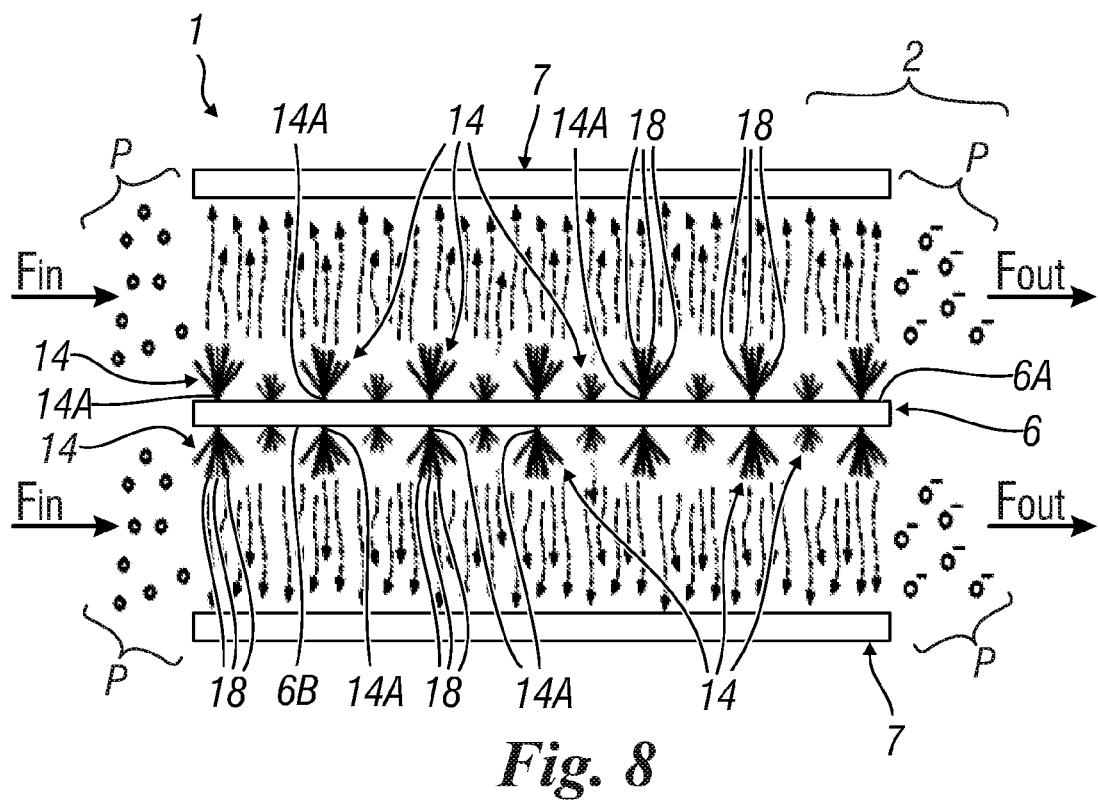
Figure 9:
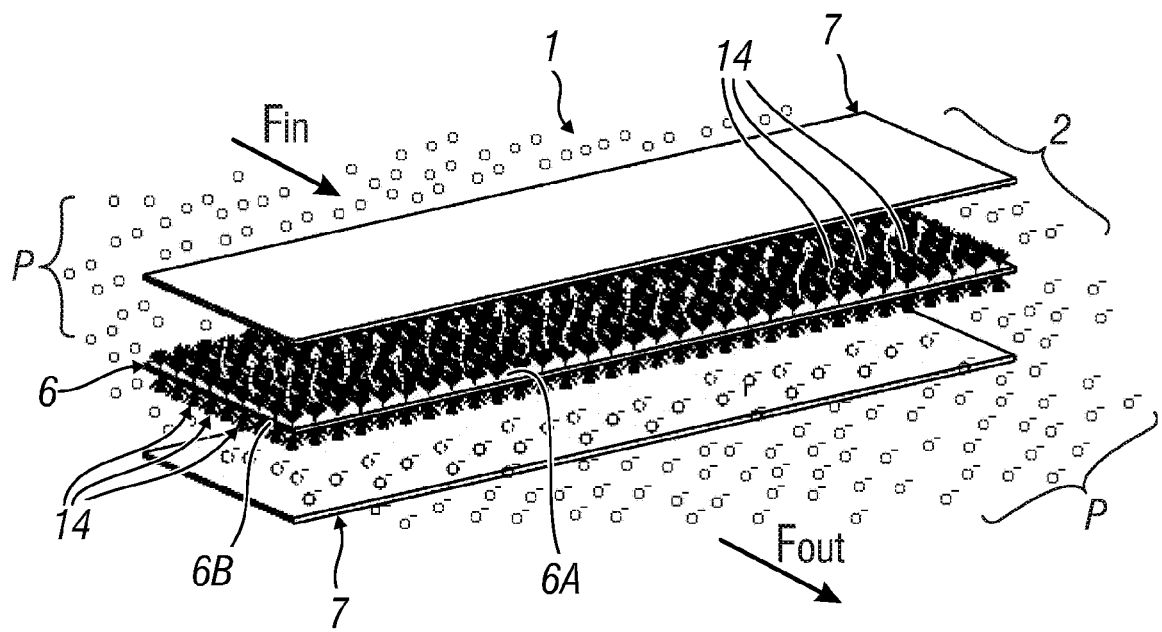
FIG. 9 shows an exploded perspective view, of the embodiment shown in FIG. 8.

FIGS. 8 and 9 show a variant of solution in FIG. 5, with ionizing part 2 provided with the elongated branched elements 14 or each provided with a plurality of wire-like elements provided with end tips 18. Such elongated elements project orthogonally from the juxtaposed faces 6A, 6B of the first portion 6, made as a plate-like element (and interposed between the second portions 7 also conformed in a plate-like fashion), into the passages 10 in which the inflowing air flow (FIN) moves up to the outlet (Four) carrying solid particles which are negatively charged as described above.

Obviously, each first portion 6 is negatively charged (that is kept at negative voltage), while the second portions are kept at a positive voltage or connected to ground (to earth).

Figure 10:
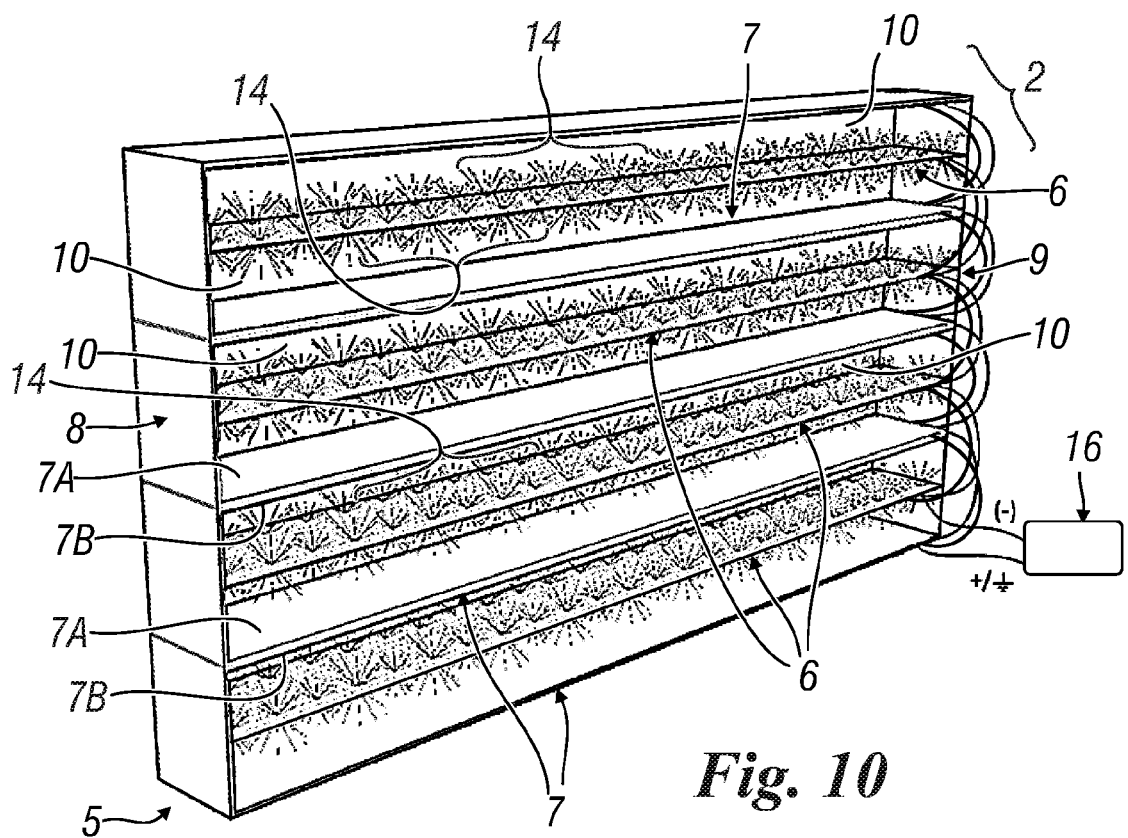
FIG. 10 shows a perspective view of a further variant of the negative ionization cell according to the invention.
Figure 11:
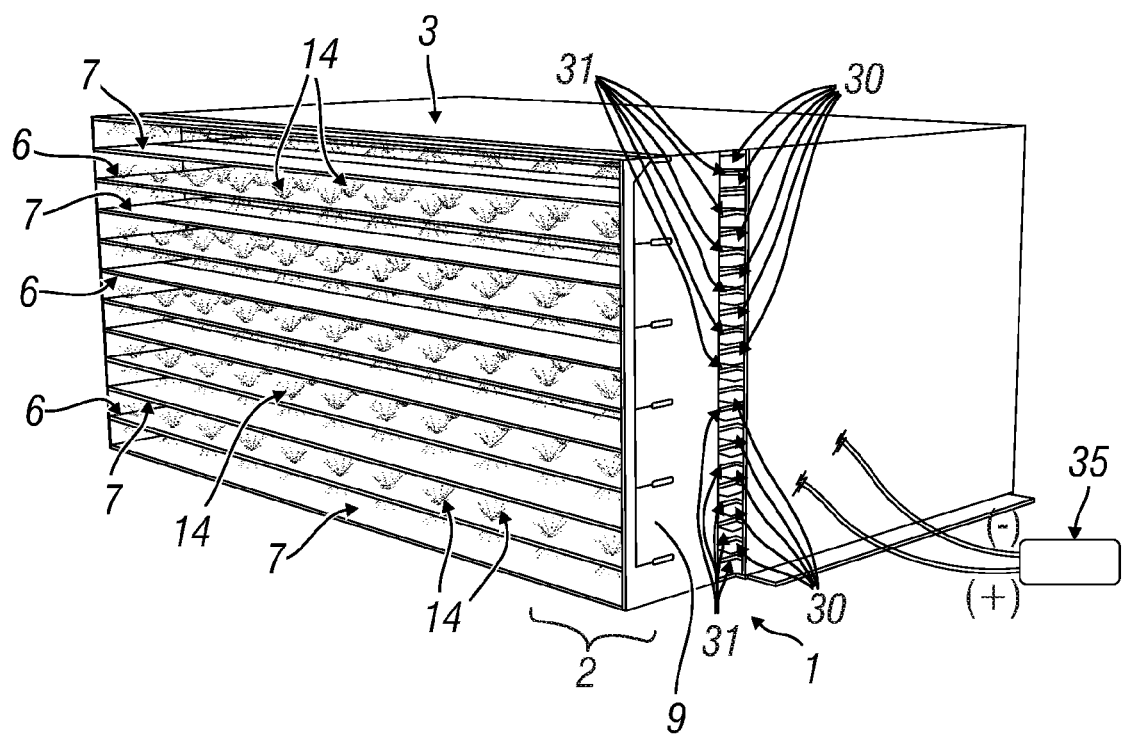
FIG. 11 shows a front perspective view of the variant of FIG. 10 with the electrical power supply of the parts thereof.

A further variant of the invention is shown in FIGS. 10 and 11. Therein, wherein the parts corresponding to the ones described previously are indicated using the same reference numerals, there is shown is a solution where the ionizing part 2 comprises a plurality of first portions 6 provided with elongated branched elements 14, conformed like those of FIGS. 5 and 8, and facing corresponding second portions 7. However, in this case the second portion 7 is interfaced, with the juxtaposed sides 7A, 7B thereof, with two first portions 6. This obviously, unless in the case of the second end portions of the body 5 of the ionization cell 1. As previously mentioned, the first portions 6 have a negative voltage, while the second portions are connected to earth (or ground) and they are connected to a positive pole of the power supply.

Obviously, appropriate insulations are present between the facing portions 6 and 7 obtained through the sides or end portions 8 and 9.

In all embodiments, the distances between each first portion 6 and each second portion 7 are also defined relating to the voltages involved.

Purely by way of non-limiting example, the first portion 6 may have 6 KV and the distance may be comprised between 20 mm and 30 mm. Modifying the voltage (negative) of the first portion 6 and the distance between the portions 6 and 7 as well as the surface extension of the portions 6 and 7 allows to increase the ionizing effect on the particles UFPs and NPs; furthermore, such voltage, distance and surface extension may be adjusted as a function of the air volume to be treated which may range between a few cubic meters per hour (for example 10 $m^3/h$) up to tens of thousands of cubic meters per hour (for example $10-50 \times 10^3$ $m^3/h$).

The materials of the portions 6 and 7 and of the elongated elements 14 are selected from per se known conductor materials (for example, copper) same case applying to insulating materials for the portions 8 and 9 which are of the per se known type.

Figure 1:
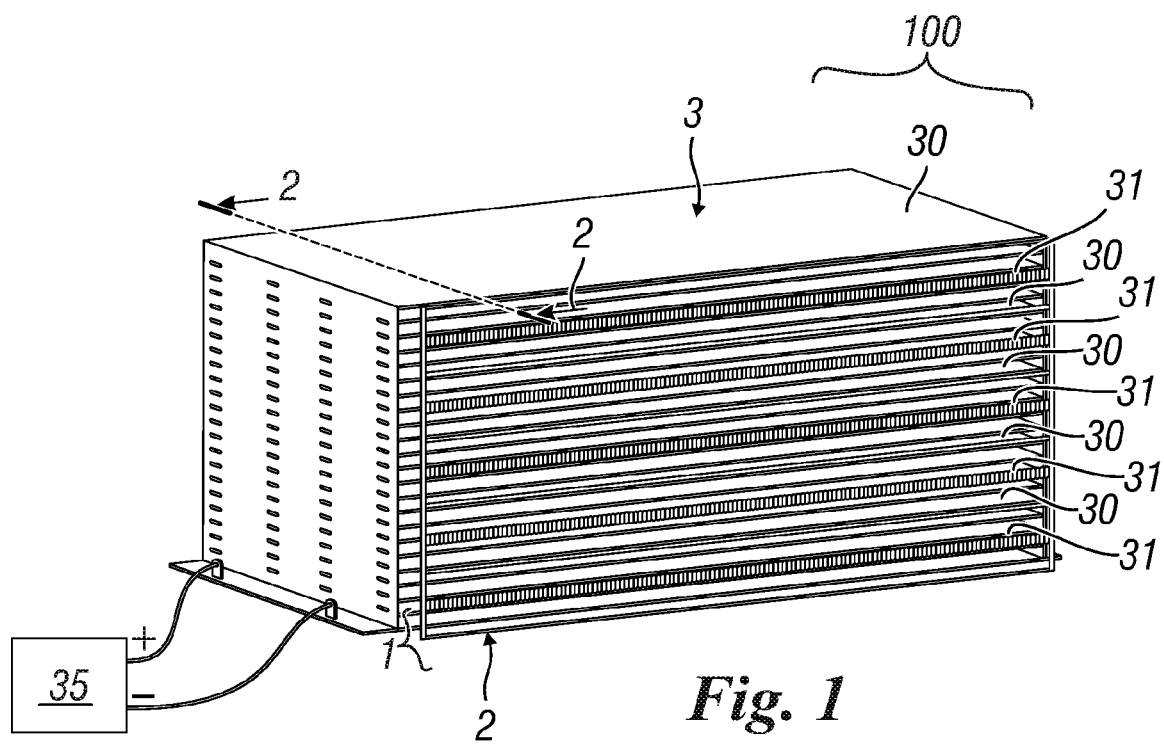
FIG. 1 shows a perspective view of an air purifier provided with a negative ionization cell and shown in the basic components thereof, which does not fall within the scope of protection of the present invention.
Figure 2:
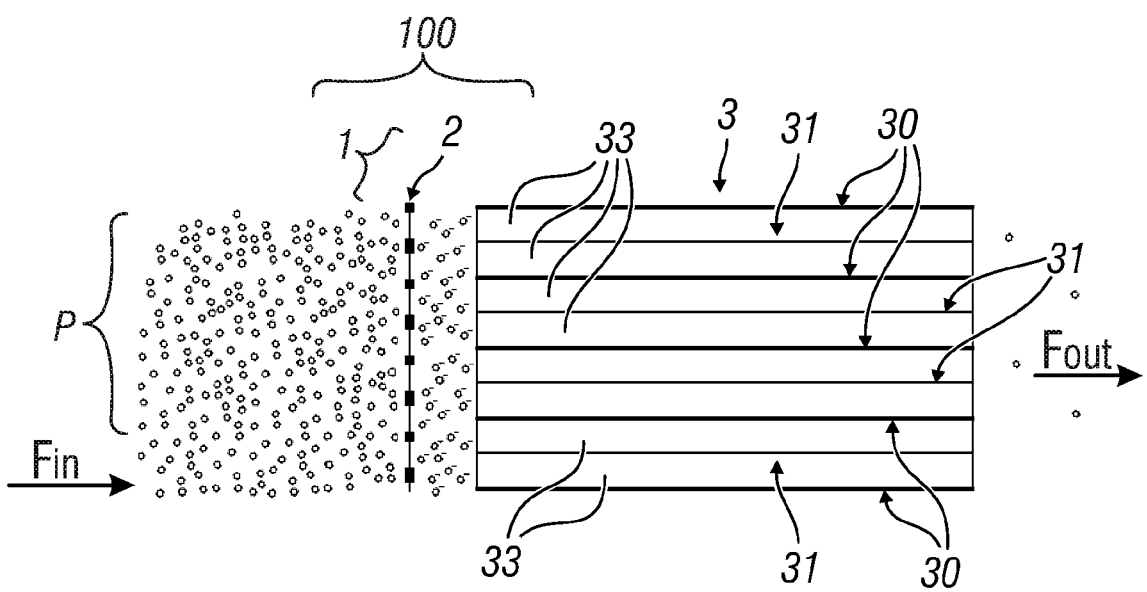
FIG. 2 shows a sectional view according to line 2-2 of FIG. 1.

As regards the collection part 3, which—with the ionization cell 1—forms the air purifier 100 (see FIGS. 1, 2 and 11), it is made of an assembly of plates (or pipes) with shape and size such to receive the air flow Four which flows out from the ionizing part 2 (part 3 is downstream of part 2 of the ionization cell 1 in the air flow direction) and retain the negatively charged particles present in such flow.

In the case of plates, the assembly of plates of the collection part 3 comprises two or more pairs of plates 30 and 31, a first plate 30 having a positive voltage value and the second plate 31 having a negative voltage value or connected to ground (earth) or suspended (or neutral) that is not negative and not connected to ground (or earth). Therefore, each pair of plates 30, 31 delimits a passage 33 for the air flow Four flowing out from the ionizing part and wherein the negatively charged solid particles are drawn by the first plate 30 (positive) and repelled by the second negative plate 31 or they are not affected in the case of suspended (or neutral) plates. Therefore, the aforementioned particles are collected by the first plate 30 which is subsequently cleared (if and when needed) in a per se known manner.

FIG. 11 shows an example for connecting the collection part 3 to a power supply 35 to power-supply the first plates 30 and the second plates 32 with appropriate and desired voltage.

In addition, according to another aspect of the invention, the collection part 3 may be provided with suitable UV lamps suitably positioned therein so as to illuminate the surfaces of the plates 30 where the organic pollutants (that is the solid particles defined by viruses, bacteria, spores, moulds, fungi and the like) deposit, making them inactive. Such solution allows not only to eliminate particles of the UFP and NP type from the purified air flow, but also to remove-therefrom-viruses, bacteria, spores, moulds and fungi which are also inactivated (that is they are no longer capable of infecting and replicating themselves).

Therefore, the device 100 is capable of purifying the air filtered from solid particles defined by the inert or biologically active particulate, even ultrafine-sized or of the nanoparticles present up to tens and tens of thousands of units per $cm^3$ in indoor environments or hundreds of thousands of units per $cm^3$ in chimney stack fumes and in exhaust gases of internal combustion engine vehicles.

This is obtained thanks to an ionizing cell according to the invention which, in a manner different from the methods previously used in purifiers, allows a far more effective ionization of the fine and ultrafine particulate and of the nanoparticles present with high density in fumes and in exhaust gases, once the latter pass through the intense flow of electrons, regarding which it is also possible to decide the depth thereof and therefore the time that the particles need to pass through it, increasing the negative charge thereof. This results in an easier subsequent capturing when such particles pass through the electric field created by the plate (or by the pipe) with positive polarity of the collection part 3.

In case of high flow rates of fumes and exhaust gases with high density of fine and ultrafine particles and nanoparticles, there actually arises the need to have a very efficient ionizing system where there is used only an intense flow of electrons which goes from the end tips 18 present in the ionization cell to which there is applied an appropriate negative voltage toward the portion 7 to which there is applied an appropriate positive voltage or it is connected to earth; the path thereof, that is the space that the fine and ultrafine particles and the nanoparticles travel inside this intense flow of electrons, can be extended by simply extending the depth of the ionization cell, that is of the first and of the second portion 6 and 7.

In the ionization cells according to the invention, the number of electrons emitted by the many tips 18 in several successive rows, power-supplied with negative voltage and drawn by the positive electric field of the second portion 7 is much more intense. Lastly, thanks to the fact that the electron flow moves orthogonally with respect to the air flow of the fumes, of the exhaust gases or of the indoor environment air, the particles present therein are forced to pass through more and more electron flows acquiring a significant negative charge which will facilitate the capturing thereof, thus allowing the air purifier as a whole to obtain a much, much higher abatement rate as compared to the one that could be obtained using the prior art solutions. In particular, this occurs as regards ultra-fine particulate and nanoparticles (measuring 1 nm-100 nm) which, as mentioned, are usually present with very high density in fumes, in exhaust gases and now even in the air of indoor environments.

Various embodiments of the invention have been described. However, many other variants may be provided in the light of the preceding description so that they can fall within the scope of protection of the invention defined by the claims that follow.

The invention claimed is:

1. A negative ionization cell configured to negatively ionize fine solid particles, ultrafine solid particles and nanoparticles present in an air flow defined by fumes, vehicle exhaust gases or of the air of an indoor environment, said negative ionization cell being configured to provide a negative electric charge to the solid particles contained in the air flow when they pass through the ionization cell, the ionization cell having a body defining an ionizing part comprising a first and a second portion elongated and facing with respect to each other, the first portion being supplied with negative voltage to generate a potential difference with the second portion, said first and second portion defining a passage for the air flow, said first portion supporting a plurality of elongated and sharp-pointed bodies projecting into said passage orthogonally to the air flow and generating a flow of electrons directed toward the second portion so that the electrons intercept the solid particles present in the air flow to charge them negatively, wherein each elongated and sharp-pointed body of said plurality of elongated and sharp-pointed bodies projecting into the passage in which the air flow moves has a branched configuration and comprises a plurality of elements with end tips from which corresponding electron flows are generated, the plurality of elements in the each elongated and sharp-pointed body open in a cone-shaped fashion.

2. The ionization cell according to claim 1, wherein the elongated and sharp-pointed branched bodies are alternatively arranged on the same row or they are arranged on different rows on the first portion.

3. The ionization cell according to claim 2, wherein each elongated and sharp-pointed branched body comprises a base element connected to the first portion from which the elements provided with a tip protrude, said elements branching from said base element.

4. The ionization cell according to claim 3, wherein said elements provided with a tip open in the cone-shaped fashion on the base element.

5. The ionization cell according to claim 1, wherein said first and/or said second portion have a configuration of a linear body and said air flow flows in a direction along a length of the linear body, the second portion being supplied with a positive voltage or being connected to earth.

6. The ionization cell according to claim 1, wherein said first and/or said second portion have a flat or curvilinear plate-like conformation and the air flow flows in a direction along a length of the flat or curvilinear plate-like conformation, said second portion being supplied with a positive voltage or being connected to earth.

7. The ionization cell according to claim 5, wherein said first portion is parallel to the second portion.

8. The ionization cell according to claim 1, wherein said first portion of the body of the ionizing part comprises two juxtaposed faces supporting corresponding pluralities of elongated and sharp-pointed branched bodies, each face being arranged frontally with respect to corresponding second portions of the body of the ionizing part.

9. The ionization cell according to claim 1, wherein the ionizing part comprises a plurality of first portions interposed between second portions, a corresponding passage for the air flow being provided for between them, said ionizing part comprising a plurality of passages for the air flow in the ionizing part.

10. The ionization cell according to claim 1, wherein said first and second portion are supported by end portions made of at least partially electrically insulating material.

11. The ionization cell according to claim 1, wherein said solid particles are made of inert material such as ashes or biologically active material such viruses, bacteria, spores, molds, fungi.

12. An ionization air purifier for purifying an air flow containing ultrafine solid particles and nanoparticles passing through the air purifier, said air purifier comprising an ionizing part and a collection part, the ionizing part being configured to provide a negative electric charge to the solid particles contained in the air flow when they pass through said ionizing part of the air purifier, the collection part being configured to collect the negatively charged solid particles at the outlet of the ionizing part to remove them from said air flow, the collection part being arranged downstream of the ionizing part of the ionizing cell in the direction of the air flow, said collection part having a configuration comprising at least two plates, a first plate having a positive voltage value and the second plate having a negative voltage value or being connected to earth or neutral, said plates delimiting a passage for the air flow (Four) flowing out from the ionizing part, said first plate drawing the negatively charged solid particles present in the air flow thereto removing them from the latter, wherein said ionizing part belongs to an ionizing cell according to claim 1.

13. The ionization air purifier according to claim 12, wherein said first plate cooperates with at least one UV lamp to make the biologically active particles, drawn toward the first plate, inactive.

* * * * *